Oct. 20, 1936. C. A. S. JENSEN 2,057,952
THERMIONIC VALVE DEVICE
Filed March 1, 1933 2 Sheets-Sheet 1
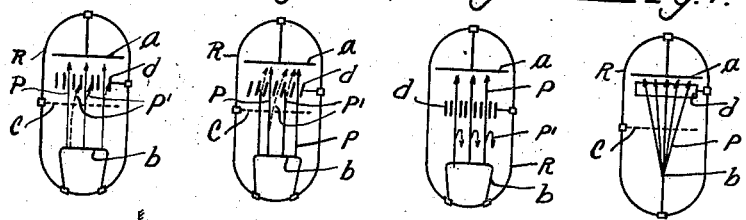
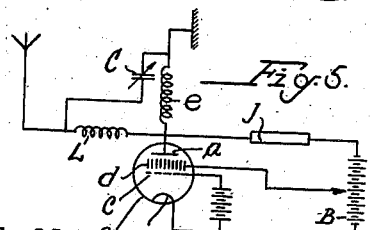
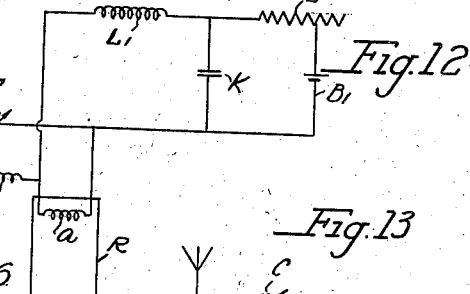
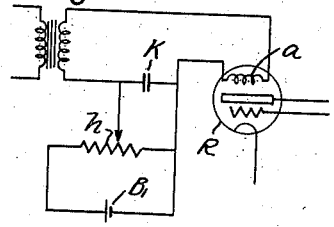
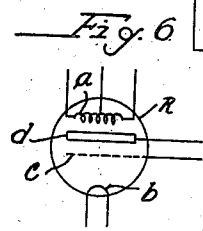
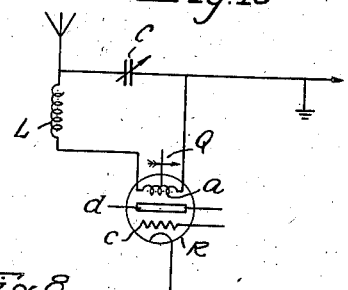
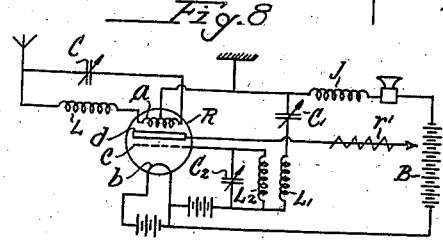
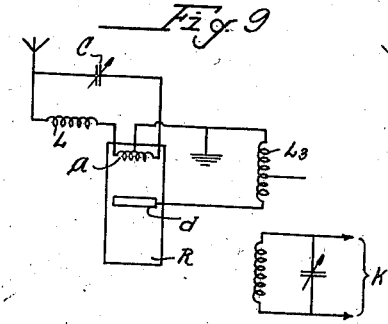
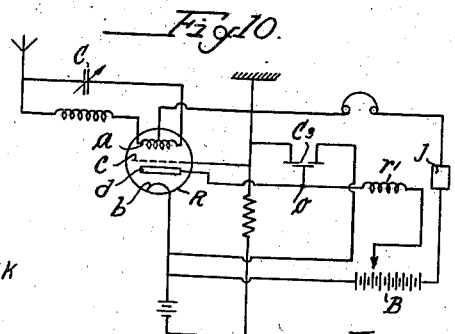
Inventor:
Carl Arne Schleimann Jensen
By _____ Attorney Oct. 20, 1936.                C. A. S. JENSEN                 2,057,952
                         THERMIONIC VALVE DEVICE
                          Filed March 1, 1933           2 Sheets-Sheet 2
Fig. 14   Fig. 15   Fig. 16   Fig. 17
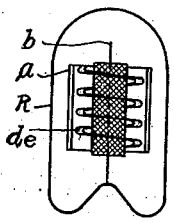 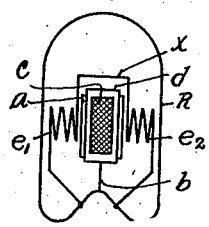 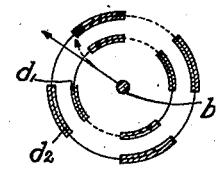 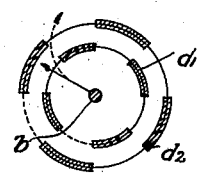
Fig. 18
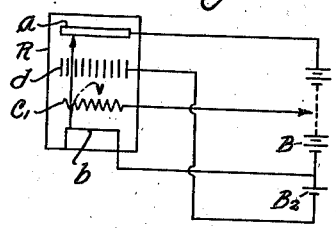
Fig. 19
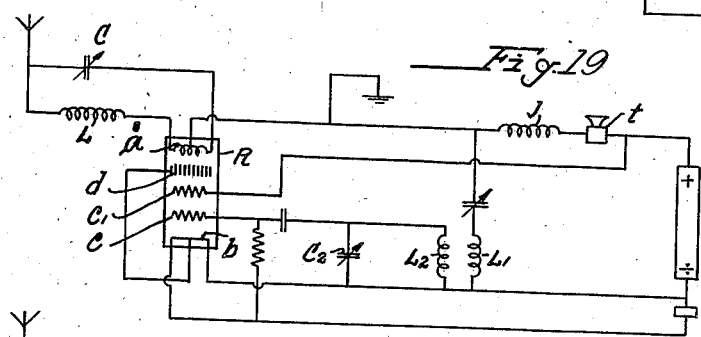
Fig. 20
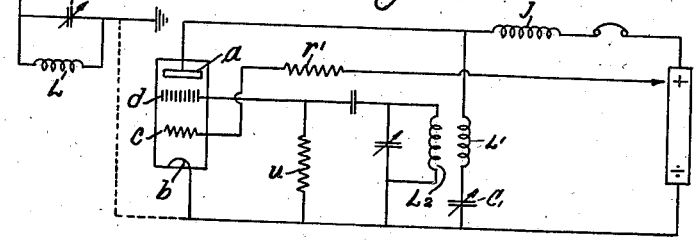
Inventor:
Carl Arne Schleimann Jensen
By
          Attorney.

Patented Oct. 20, 1936

2,057,952

UNITED STATES PATENT OFFICE 2,057,952

THERMIONIC VALVE DEVICE

Carl Arne Schleimann Jensen, Charlottenlund at Copenhagen, Denmark, assignor to Skandinavisk Radiorørfabrik Aktieselskab, Copenhagen, Denmark, a joint-stock company of Denmark Application March 1, 1933, Serial No. 659,216
In Denmark March 1, 1932

15 Claims. (Cl. 250—27)

It has previously been proposed to amplify electrical oscillations by means of electron valves, the electron currents of which are controlled magnetically.

In valves of this type known hitherto, a solenoid has usually been employed for effecting the magnetic control, a portion of the amplified currents being passed through the solenoid and producing thereby a magnetic field, which deflects the electrons more or less from their rectilinear paths and thereby causes a varying distribution of the electrons over various sections or parts of one and the same anode or over two separate anodes. This unequal distribution of electrons is utilized for the production of current variations in the anode circuit.

It has also been proposed in thermionic valves, the electron current of which is controlled electrically by the usual control grid, to use a supplementary magnetic control by means of a coil included in the output circuit of the valve and adapted to deflect the electron stream periodically entirely from the anode in order to avoid hanging-on effect.

Further, it has been proposed in thermionic valves, the electron current of which is controlled electrically, to apply a magnetic volume control by means of a coil being energized by a separate adjustable direct current, creating in the coil an adjustable magnetic field, which deflects the electrons from their normal paths and makes them strike an intermediate electrode inserted between the anode and the cathode, which electrode thereby emits secondary electrons. With a proper choice of the strength of the magnetic field or of the potential of the said intermediate electrode comprising a number of flat conducting members arranged parallel to or obliquely relatively to the paths of the electrons, the secondary emission of electrons to the anode may be adjusted to any desired value—if desired—so as to be in excess of the primary emission.

All of the above valves having magnetic control of the emission in common with the ordinary electron valves, in which the electron current is controlled only electrically, have the disadvantage that the natural vibrations of the valve may extend into the input circuit and, thereby, may actuate external circuits, such as an antenna or like circuit, and produce disturbances therein.

The present invention relates to thermionic valves, in which the electron stream is controlled magnetically—other than magnetic volume control—and in which there is provided between the anode and the cathode an intermediate electrode of the kind referred to above in connection with a valve having magnetic volume control, and the purpose of the invention is to secure a valve, the electron emission of which is controlled magnetically by the input current, and by which natural oscillations generated in the valve cannot appear in the input circuit, when the valve is used in an amplifier or wireless receiver.

According to the present invention, a thermionic valve for effecting magnetic and electric control of the electron current passing therethrough comprises a separate electrode adapted to catch or to reflect a part of the electrons deflected from predetermined paths, which are not necessarily rectilinear by a magnetic field created by the input current. This separate electrode, which in the following description is called the reflecting electrode, is disposed between the cathode and the anode. According as to whether the reflecting electrode is given the same potential as the cathode or a negative or a positive potential, the electrode will reflect or, in the last-mentioned case, will catch a quantity of electrons proportional to the deflection, the anode current being thereby varied in accordance with the deflection. An emission of secondary electrons from the reflecting electrode is usually not aimed at.

The valve may be used in all cases in which thermionic valves having two or more electrodes have been used hitherto, either alone or in association with one or more valves of the same kind or of a kind heretofore known. The valve may be used for amplification of high-frequency, as well as low-frequency currents, for rectification of such currents, as a detector, as a generator of oscillations, as a modulator, etc.

The means for effecting magnetic control comprises a solenoid which, as is the case with known valves which are controlled magnetically, may either be an independent coil and is in this case disposed either inside or outside of the valve and may in known manner be formed by the anode itself. In one modification, the solenoid may in accordance with the invention constitute the reflecting electrode.

Between the anode and cathode, one or more grid electrodes of the usual type may, if necessary, be provided, or the valve may be constructed without such grids or may have a so-called external grid.

The solenoid is included in a circuit, which otherwise is not passing through any part of the valve, but forms the input circuit of the latter for the high or low-frequency currents to be amplified or rectified in the valve. This input circuit may be a coupling circuit, by means of which the valve is connected to an antenna, a preceding part of an amplifier or the like. The current in the input circuit exercises solely a magnetic control upon the electron current in the valve, but not as in the ordinarily known valves by modifying a grid potential of the valve.

If there is provided in the tube a separate grid, then the grid circuit of the latter is coupled to the anode circuit, in such a manner that the grid will receive its potential impulses from the latter. As appearing from the following, the deflecting anode may be used as a grid, or one or more special grids of known nature may be provided between the cathode and the anode. The electrodes of the valve may otherwise be constructed and connected in many different manners, several ones of which appear from the following description of the constructions, shown on the drawings, of valves of the present kind and amplifiers and oscillation-generators or transmitters, in which the valves are used.

Figs. 1, 2 and 3 illustrate diagrammatically the basic forms of an electron valve constructed according to the invention, in front elevation, Fig. 4 the basic forms shown in Figs. 1 and 2, in side elevation, Fig. 5 a wiring diagram for the valve used as an amplifier or detector, Fig. 6 a diagrammatical view of the same valve, Fig. 7 diagrammatically, the valve used with magnetic governing of the electron current, Fig. 8 the valve used as a high-frequency detector and high-frequency amplifier valve with magnetic as well as electric governing of the electrons, Fig. 9 a modified construction of the connections between the anode and the deflecting electrode in the application of the valve shown in Figs. 7 and 8, Fig. 10 a wiring diagram for a modified construction of the device according to Fig. 8, Figs. 11 and 12 two different constructions of the inlet circuit of the electron valve, Fig. 13 a connecting arrangement, by which the anode current passes through a part of the windings in the solenoid serving to effect the magnetic governing and acting at the same time as an anode, Fig. 14 diagrammatically, a longitudinal section of a construction of an electron valve, in which the solenoid is formed by the deflection electrode, Fig. 15 diagrammatically, a construction of the valve with a twin solenoid disposed inside thereof, Figs. 16 and 17 diagrammatical cross-sections of two different constructions of a deflecting electrode composed of several segments disposed in a circle around the cathode of the valve and shaped as parts of one and the same cylinder surface, Fig. 18 diagrammatically, the connection of the electrodes in the valve to the sources of voltage used in connection with the latter, in cases in which a negative initial voltage is impressed on the deflecting electrode, Fig. 19 a wiring diagram for an amplifier, by means of which the electron-deflecting electrode in a valve of the present nature reflects the deflected electrodes, and Fig. 20 the wiring diagram for a device in which the deflecting electrode of the valve partly reflects the deflected electrons and partly acts as a governing grid.

Figs. 1 to 4 show the essential features of an electron valve R constructed according to the invention and containing, an anode $a$ and a cathode $b$, also a deflecting electrode $d$ disposed between the anode and the cathode, which deflecting electrode in Figs. 1, 2 and 3 is shown, diagrammatically, to be constructed as several mutually parallel surfaces, although the constructional design of the deflecting electrode may deviate very considerably from these basic forms, cf. the following description of Figs. 14 to 17, and does not necessarily presume the deflecting electrode $d$ to be composed of several separate surfaces.

In the constructions shown in Figs. 1 and 3, the said surfaces are parallel to the full lines indicating the rectilinear paths P of the electrons, while in the construction shown in Fig. 2 they form an angle with the said paths of motion. In the basic forms shown in Figs. 1, 2 and 4 a governing grid $c$ of ordinary known kind is inserted between the cathode and the electrode $d$. Likewise as the other electrodes in the valve the electrode $d$ is fitted with an outlet by means of which it can be connected to an outer circuit. The cathode $b$ may be cold, or may be directly or indirectly heated.

If the electron current in the valve is actuated by a magnetic governing field produced by a solenoid (not shown in Figs. 1 to 4), which solenoid may be disposed outside of or, as further mentioned in the following, inside of the valve, the electrons will be deflected from the rectilinear paths P to the curved paths P' shown by dotted lines.

If a positive potential is impressed on to the deflecting electrode $d$ relatively to the cathode and the grid $c$, the electrode $d$ will catch a quantity of electrons varying with the deflection. If the same potential is impressed on to the electrode $d$ as on the cathode or, if a negative potential with respect to the cathode is applied to the electrode $d$, the latter will reflect a quantity of electrons varying with the deflection, as indicated in Fig. 3.

In either case, assuming that the potentials which are applied to the anode and the grid remain constant, the anode current will be subject to corresponding variations. In the valves of the basic form shown in Fig. 1 the anode current will decrease with increasing deflection, because the electrode $d$ will catch a quantity of the electrons increasing with the deflection, while in valves of the basic form shown in Fig. 2 the anode current at the start will increase with the deflection, and will reach a maximum value, when the surfaces of the electrode $d$ are tangential to the parts of the curved paths of the electrons that are situated between the said surfaces. With the arrangement in Fig. 3 the anode current will decrease for increasing deflection, if the surfaces of the electrode $d$, as shown, are parallel to the rectilinear paths of motion of the electrons. If this is not the case, if the surface of the electrode $d$ of the valve under the conditions assumed in Fig. 3, viz. with a negative initial voltage on the electrode $d$, is obliquely disposed relatively to the rectilinear paths of the electrons, cf. Fig. 2, then the anode current likewise as in the arrangement according to the last mentioned figure, will increase at the start with increasing deflection. It should be noted that no matter whether the electrode $d$ has to act by reflecting or by catching the electrons, the valve may be constructed without or with grids of ordinary known kind.

Fig. 5 shows the use of a valve of for instance the basic form shown in Fig. 1 as a high-frequency amplifier and detector. Reference character $e$ designates the above mentioned solenoid, which serves to control the electron current magnetically. In Fig. 5 this solenoid is situated outside of the valve, but as further described in the following it may be disposed inside of the valve.

The solenoid $e$ is inserted in the receiver circuit for the high-frequency currents to be amplified. This circuit is assumed to be an antenna circuit with an induction coil L and a tuning condenser C.

The high-frequency currents produce, in the solenoid, magnetic fields which deflect the electrons in the valve R from their rectilinear paths of motion. These deflections are effected alternately to opposite sides in accordance with the frequency of the high-frequency oscillations, and if the surface or surfaces of the electrode $d$ are parallel to the rectilinear paths of the electrons cf. Fig. 1, the said deflections will cause the anode current to decrease, whether the deflection be effected to one or the other side, i. e., besides an amplification, a rectification of the high-frequency oscillations will be effected. The anode current is consequently caused to vary at a frequency that is twice as high as the frequency of the high-frequency currents in the receiver circuit.

The anode of the valve is connected, in the same manner as for the heretofore known electron valves, across an impedance J of any suitable known kind and a direct-current source of voltage B, to the cathode $b$. The electrode $d$ is connected, for instance as shown, to a point of the anode circuit which has a positive potential relatively to that of the cathode $b$, and is situated on the side of the coupling impedance J of the anode circuit that faces away from the anode, in such a manner that any anode current caught by the electrode $d$ will be diverted from the said impedance, to which one or more amplifier circuits (not shown) may be coupled in ordinary known manner.

If a potential is impressed on to the electrode $d$ negative relatively to that of the cathode, the anode current will vary in an exactly corresponding manner, although the electrode $d$ does not act by catching the electrons but by reflecting the same towards the cathode or—if one or more grids be provided between the latter and the electrode $d$—then against one of these grids.

If in the arrangement in Fig. 5, instead of the basic form for the electrode $d$ shown in Fig. 1, the basic form shown in Fig. 2 is used for amplification of the high-frequency currents, then it will be possible to attain an amplification with unaltered frequency. This will be understood directly, if it is considered that the anode current will increase when the electrons are deflected to one side, and will decrease when the electrons are deflected to the other side.

An amplification without alteration of the frequency may also be attained with the basic form of the valve R shown in Fig. 1 or in Fig. 3, if as mentioned below in connection with Figs. 7, 11 and 12 the solenoid $e$, Fig. 5, is loaded with a constant continuous current, which deflects the electrons from their linear paths, when no high-frequency currents pass through the solenoid.

In that case the anode current will increase when the electrons are deflected to one side, and will decrease for deflection to the opposite side, viz. in the last mentioned case when the deflection effected by continuous current and the periodic deflection effected by the high-frequency current are superimposed. In similar manner the solenoid $e$ for a valve of the basic form shown in Fig. 2 may be supplied with a direct current, the advantage being thereby attained that the electrons will follow the paths indicated by the dotted lines P', when the valve is not actuated by high or low-frequency currents. In such a case the valve, when used in the manner shown in Fig. 5, will cause a doubling of the frequency of the oscillations received, cf. the above description.

For amplification of low-frequency currents the valve is used in a manner corresponding exactly to the one described above for high-frequency currents. The amplification of low-frequency currents, however, should be effected without any doubling of frequency.

As mentioned above, Figs. 1, 2 and 3 show only diagrammatically the principal basic forms of the design of the valve. The constructional arrangement of the electrode must be adjusted to suit the shape of the valve and the anode, and according to the position of the grids, if any, relatively to the other electrodes of the valve, including the electrode $d$.

Fig. 6 shows a diagrammatical representation of an electron valve built in accordance with the invention, in which the solenoid $e$, Fig. 5, is situated inside of the valve and is formed by the anode $a$ itself. The latter is formed as a solenoid encircling the cathode $b$ so that the axis of the coil is parallel to the cathode. A grid $c$ may be disposed between the cathode and the electrode $d$, the electrode $d$ being situated between the grid and the anode which, in the form shown in Fig. 6, has three leads connected to the ends and to the middle point of the anode, respectively.

Instead of having a single grid or, maybe, no grid, the valve may be provided, in usual manner, with several grids.

Fig. 7 shows the use of the electron valve according to Fig. 6 with magnetic control of the electron current in a manner similar to that described in connection with the arrangement according to Fig. 5. G indicates a source for high or low-frequency currents to be amplified. The electrode $d$ serves solely to catch electrons that are deflected from given paths of motion, and the grid $c$ acts as an ordinary space-charging grid. In the circuit comprising the solenoid $a$ and the source of oscillations G there may be inserted a battery $B_1$, for instance connected in parallel with a resistance $h$, or some other continuous current source, by means of which the solenoid $a$ can be supplied with a constant continuous current for the purpose mentioned above in connection with Figs. 1 and 2.

Fig. 8 shows the use of a valve of the kind referred to, fitted with electric as well as magnetic control of the electron current. The anode $a$, formed as a solenoid, is here inserted in an input circuit, which as in the arrangement shown in Fig. 5 is assumed to be an antenna circuit, but which may be a circuit of any other suitable kind, for instance a coupling circuit or the like disposed in a part of an amplifier preceding the valve R, of which the valve R forms a part. The anode circuit of the valve contains, besides the coupling impedance J, a source of continuous current B and a variable condenser $c_1$ and a coupling coil $L_1$ connected in series thereto.

This coil is coupled inductively to a coil $L_2$ in the grid circuit of the valve which contains besides the coil $L_2$ also a tuning condenser $C_2$, by means of which it can be tuned. The frequency to which the circuit is to be tuned will either be double or the same as that of the current in the input circuit, depending upon whether amplification is effected by the valve at doubled or unaltered frequency.

It will be clearly seen that the variation in voltage effected in the grid circuit in consequence of the coupling of the latter to the anode circuit, by suitable coupling between the coils $L_1$ and $L_2$ will support the anode-current variations produced by the magnetic control caused by the current in the input circuit, since the grid-voltage variations will control the electron current electrically in ordinary manner, and an amplification of the anode currents will thereby be obtained which is independent of these variations.

Any natural vibrations produced in consequence of the back-coupling of the anode circuit to the grid circuit will not be reproduced in the input circuit which is independent of the flow of the anode current and of the potential variations on the electrodes of the valve.

As will appear from an examination of Figs. 7 and 8, the current deflected by the electrode $d$ cannot actuate the coupling impedance of the anode circuit, and if the electrode $d$ be connected directly to a point in the source of anode potential, as shown in these figures, the variations in the said current will not appreciably influence the potential on the electrode $d$.

It is possible, however to utilize the said deflected current in such a manner that the same will support the action of the magnetic control on the anode current. This may be done in various manners, for instance by inserting, in the connection between the electrode $d$ and the source of anode voltage, an alternating-current resistance $r_1$—as indicated by dotted lines in Fig. 7. Any alteration of the deflected current will cause a modification of the drop of voltage across the resistance $r_1$, and, accordingly, a modification of the potential on the electrode $d$, in consequence whereof the anode current will be further modified. The deflected current may also be utilized for supporting the magnetic control by connecting, as shown in Fig. 9, the anode $a$ to the electrode $d$ across a coupling impedance, for instance an induction coil $L_3$, and connecting one terminal of the source of anode voltage to a point thereof and, in addition, coupling the coil $L_3$ for instance to a circuit K leading to a subsequent stage in the amplifier, or to a grid circuit (not shown) of the valve R. It will be seen directly that by a suitable construction of the coil $L_3$ the advantage is obtained that the anode current and the deflected current will support one another in respect to the action on the last mentioned circuit.

Further the deflected current may be utilized for producing variations in the potential of the grid $c$, for instance by connecting the valve in the manner shown in Fig. 10. The grid $c$ is here shown to be disposed between the anode and the electrode $d$, and it is not necessary to insert a special tuned grid circuit as in the arrangement according to Fig. 8, in order to cause the grid-voltage variations to support the variations in the anode current that originate from the magnetic control.

The electrode $d$ is connected to the source of voltage across an alternating-current resistance $r_1$, and a differential condenser $C_3$ is inserted between the cathode $b$ and a point $o$ in the circuit of the deflected current, in such a manner that the potential variations occurring at the point $o$ in consequence of the electron deflections will be transmitted to the grid $c$. Since the variations in the currents from the anode and electrode $d$, respectively, to the cathode will be mutually in opposite phase, the voltage variations impressed in the manner described above on the grid $c$ will support the action of the magnetic deflection on the anode current. There exists thus a sort of back-coupling from the electrode $d$ to the grid $c$.

If the deflections produced by the magnetic control are such as to make the electrons oscillate about a non-rectilinear path, the solenoid $e$ or $a$ is supplied, as mentioned above, with a continuous current (Fig. 7), which is introduced into the input circuit of the valve, and by a variable resistance $h$ is adjusted as desired, in such a manner that a suitable deflection will be attained.

Figs. 11 and 12 show two different constructions of an input circuit supplied with direct current and varying somewhat from the input circuit shown in Fig. 7. $k$ is a blocking condenser connected in parallel with the resistance $h$, which condenser, as far as alternating currents are concerned, short-circuits the said resistance. By the arrangement in Fig. 12 the valve is adapted to amplify high-frequency currents. The self-induction of the coil L is so selected that the greater part of the high-frequency currents, which are fed into the input circuit in any known manner, will pass through the solenoid $a$ disposed in parallel with the coil L and the condenser C. The coil L' may be a choke coil for high-frequency currents, in which case the condenser $k$ may be dispensed with.

A certain given deflection of the electrons will in fact be attainable without the use of a continuous current in the inlet circuit, viz. if the anode current in the valve is caused to run partly through the windings of the solenoid, for instance as illustrated by the arrow Q in Fig. 13. This result will be attained if the output from the anode to the anode circuit is not, as above, taken from the centre of the solenoid but from one end thereof. The anode current will then partly pass through the windings of the solenoid, and will produce a magnetic field which causes a deflection. This deflection will be constant, as long as the anode current is constant.

Instead of combining, as described above, the solenoid with the anode, a separate solenoid may be used, which for instance if the anode is annular and encircles the cathode may be disposed outside of the anode, for instance so as to encircle the latter, or inside of the anode co-axially thereto. Fig. 14 shows by way of example the solenoid $e$ and the electrode $d$ combined so as to form one single electrode disposed inside of the anode. This electrode forms a helical surface such as would be generated by a flat strip situated between the anode and the cathode or one of the grids encircling the latter. Alternatively, the solenoid may be disposed in such a manner that its axis will be perpendicular to the axis of the anode (Fig. 15) in which the solenoid is shown to be composed of two parts $e_1$ and $e_2$, also forming helical surfaces as described above interconnected by a wire $x$.

The deflection of the electrons is in this case effected in planes through the cathode, for which reason the surfaces of the deflecting electrode $d$ must be situated in planes neither containing the cathode nor being parallel thereto, and the electrode $d$ may for instance be constructed as shown in Fig. 14.

The electrode $d$ and the solenoid $e$ may otherwise be constructed and disposed in any other suitable manner than described above, without thereby exceeding the scope of the invention. Figs. 16 and 17 show thus two different constructions of the electrode $d$, in which the electrode consists of two rows of electron-catching bars $d_1$ and $d_2$ arranged in circles about the cathode $b$. These bars each form a portion of a circular surface. One row of bars is disposed inside of the other one, and the bars in one row may be situated radially inside of the bars in the other row as shown in Fig. 16 or, as shown in Fig. 17, they may stagger with these bars in a peripheral direction, depending on whether the deflection of the electrons from the given, for instance rectilinear, paths of motion are required to produce a reduction of doubling or no doubling of frequency, cf. the above description. One of the two rows of bars in the electrode $d$, for instance the bars $d_1$, Figs. 16 and 17, may perhaps also serve as a control grid, in which case the bars $d_1$ must not be conductively connected to the bars $d_2$ inside of the valve R.

It will be seen directly that since the anode $a$ as well as the deflecting electrode $d$ catches electrons the two said electrodes may be substituted for one another, as far as their functions are concerned, in such a manner that the electrode $d$ will serve as an anode and the electrode $a$ as a deflecting shield. As a result the two electrodes can also be exchanged mutually in respect to their position in the valve, i. e. the electrode $d$ can be placed behind the anode instead of being placed in front thereof.

As mentioned above, by the use of valves of the present nature, either a positive or a negative potential or, even a zero voltage, i. e., the same potential as the cathode, can be impressed on the auxiliary electrode. The arrangements described above in connection with Figs. 8 to 10 have been designed chiefly for the application of a positive initial potential to the electrode $d$, but by modifying the circuit form slightly the valve may be used equally well if a negative potential is impressed on the electrode $d$.

Fig. 18 shows, diagrammatically, the connections between the electrodes of the valve and the sources of voltage employed when the valve is used with a negative initial voltage on the electrode $d$. This negative voltage is produced by using an initial-voltage battery $B_2$. The electrode $d$ will then, as mentioned above, reflect deflected electrons when a negative potential is impressed thereon. If a grid $c_1$ is provided in the valve, the latter will catch the reflected electrons and deflect the same.

Fig. 19 shows an arrangement by which the valve R is used as an amplifier with negative initial tension on the electrode $d$. The latter is connected to the central point of the cathode $b$ by any suitable known means, in such a manner that it will have the same mean potential as the cathode. Like in the constructions shown above in Figs. 4 or 8 and 10 the anode $a$ is inserted in a coupling circuit which here too is supposed to be an antenna circuit. The valve is fitted with two grids, one of which, viz. the grid $c_1$ catches the electrons reflected by the electrode $d$ and deflects the same from the anode impedance J. The other grid $c$ in the valve is a control grid to which a back-coupling is effected from the anode circuit by means of the coils $L_1$ and $L_2$. Similarly as in the constructions described above, $C_2$ is a tuning condenser in the grid circuit of the valve. The manner of operation of the valve will be understood directly from what is stated above.

It will be seen directly that the arrangement of connection, shown in Fig. 19 mainly corresponds to the one shown in Fig. 8, the difference between the said two arrangements being in the main merely that by the arrangement according to Fig. 8 the electrode $d$ itself deflects electrons by catching the same, while in the arrangement according to Fig. 19 the electrode $d$ deflects the electrons by reflecting the same to a shield grid $c_1$. In the same manner as Fig. 19 has been deduced from Fig. 8, a circuit arrangement, in which the electrode $d$ has negative initial voltage, or zero voltage may be deduced from the various constructions described above in which a positive initial voltage is assumed to be applied to the electrode $d$.

Fig. 20 shows an arrangement in which the deflecting electrode $d$ acts partly as such and partly as a control grid. In this construction the electrode $d$ is coupled to the anode circuit in exactly the same manner as the grid $c$ is coupled to the anode circuit in the arrangement shown in Fig. 8, viz. by means of the coupling coils $L_1$ and $L_2$, and the electrode $d$ is inserted in a circuit containing the tuning condenser $C_2$. It will be seen directly that by this arrangement the electrode $d$ will act as a control grid and, at the same time, will serve to reflect electrons to the auxiliary grid C, since the electrode $d$ and the cathode $b$, by virtue of the fact that the former is connected to the latter across a resistance $u$, assume the same potential in the absence of signals.

In the connection between the grid $c$ and the anode-voltage source B the above mentioned resistance $r_1$ may be inserted, cf. Fig. 7. In this resistance the current deflected across the grid $c$ will produce variations in voltage, by which the potential on the grid $c$ is caused to vary. These variations in potential act back on the electron current and support the anode-current variation produced by the magnetic control.

Having now particularly described and ascertained the nature of my said invention and in what manner the same is to be performed, I declare that what I claim is:—

1. A thermionic valve system containing an evacuated valve having an anode surface and a cathode, an input circuit for said valve, means comprising an inductance coil inserted in said input circuit and arranged to magnetically control the emission of electrons from the cathode to the anode, and a number of conducting surfaces positioned between the cathode and anode and arranged substantially parallel to the paths of the electrons so as to catch or reflect a quantity of the electrons deflected by the influence of the magnetic field produced by the said coil when passed by the input current.

2. A thermionic valve system containing an evacuated valve having an anode surface and a cathode, an input circuit for said valve, means comprising an inductance coil inserted in said input circuit and arranged to magnetically control the emission of electrons from the cathode to the anode, a number of conducting members situated between the cathode and the anode arranged substantially parallel to the paths of the electrons, and means for imparting to the said conducting surfaces a potential different from the potential of the cathode.

3. A thermionic valve system containing an evacuated valve having an anode and a cathode, an input circuit for said valve, a control member comprising an inductance coil inserted in said input circuit and arranged to magnetically control the emission of electrons from the cathode to the anode, an intermediate electrode interposed between the cathode and the anode and comprising a number of flat conducting members arranged substantially parallel to the paths of the electrons, a circuit connected across the cathode and the intermediate electrode and including means to impart to the intermediate electrode a potential different from the potential of the cathode, and means for tuning the input circuit including the said coil to produce maximum current in the coil.

4. A thermionic valve system containing an evacuated valve having an anode and a cathode and a coil for magnetically controlling the emission from the cathode to the anode inserted therein, an input circuit including the said coil, an output circuit connected across the cathode and the middle point of the coil, an intermediate electrode interposed in the discharge path between the cathode and the anode and comprising a number of flat conducting members arranged substantially parallel to the paths of the electrons, an external circuit connecting the said intermediate electrode to the cathode, and means for tuning the input circuit.

5. A thermionic valve system containing an evacuated valve having an anode and a cathode and a coil for magnetically controlling the emission from the cathode to the anode inserted therein, an input circuit including the said coil, an output circuit connected across the cathode and the intermediate point of the coil, an intermediate electrode interposed in the discharge path between the cathode and the anode and comprising a number of flat conducting members arranged substantially parallel to the paths of the electrons, an external circuit connecting the said intermediate electrode to the cathode, means for tuning the input circuit, and means for tuning the output circuit.

6. A thermionic valve system containing an evacuated valve having an anode and a cathode and a coil for magnetically controlling the emission from the cathode to the anode inserted therein, an input circuit including the said coil, an output circuit connected across the cathode and the intermediate point of the coil, an intermediate electrode interposed in the discharge path between the cathode and the anode and comprising a number of flat conducting members arranged substantially parallel to the paths of the electrons, an external circuit connecting the said intermediate electrode to the cathode, means for tuning the input circuit, means for tuning the output circuit, and means for coupling the output circuit to one or the other of said circuits.

7. A thermionic valve system containing an evacuated valve having an anode, a cathode and a coil for magnetically controlling the emission between the cathode and the anode, an input circuit including the said coil, an output circuit connected across the cathode and the anode, a number of intermediate electrodes interposed in the discharge path between the anode and the cathode, one of said intermediate electrodes comprising a number of flat conducting members arranged substantially parallel to the paths of the electrons, a circuit connected across one of said intermediate electrodes and the cathode to impart to the intermediate electrode a potential equal to or different from that of the cathode, and a separated circuit connected across another of the intermediate electrodes and the anode and including means for imparting to the said other intermediate electrode a potential different from that of the cathode.

8. A thermionic valve system according to claim 7, in which the circuit including the intermediate electrode adapted to catch or reflect electrons, which are deflected by the magnetic field, is inductively coupled to the output circuit.

9. An electric relay comprising an evacuated envelope having a cathode and an anode and a control coil mounted therein, an intermediate electrode interposed between the anode and the cathode and comprising a number of flat conducting members arranged substantially parallel to the paths of the electrons, an input circuit including the said coil, and an output circuit from the middle point of the coil to the cathode.

10. A thermionic valve system containing an evacuated valve having an anode surface and a cathode, an input circuit for said valve, means comprising an inductance coil inserted in said input circuit and arranged to magnetically control the emission of electrons from the cathode to the anode, a number of conducting surfaces situated between the cathode and the anode and arranged substantially parallel to the paths of the electrons so as to catch or reflect a quantity of the electrons deflected by the influence of the magnetic field produced by the said coil when passed by the input current, and means for effecting an electrostatic control of the flow of electrons in addition to the magnetic control effected by the input circuit.

11. A thermionic valve system containing an evacuated valve having an anode surface and a cathode, an input circuit for said valve, means comprising an inductance coil inserted in said input circuit and arranged to magnetically control the emission of electrons from the cathode to the anode, a number of conducting surfaces situated between the cathode and the anode and arranged substantially parallel to the paths of the electrons so as to catch or reflect a quantity of the electrons deflected by the influence of the magnetic field produced by the said coil when passed by the input current, a circuit connecting the said conducting surfaces with the cathode, and means for effecting an additional electrostatic control of the electron emission by means of the current in the last-named circuit.

12. A thermionic valve system containing an evacuated valve having an anode surface and a cathode, an input circuit for said valve, means comprising an inductance coil inserted in said input circuit and arranged to magnetically control the emission of electrons from the cathode to the anode, a number of conducting surfaces situated between the cathode and the anode and arranged substantially parallel to the paths of the electrons so as to catch or reflect a quantity of the electrons deflected by the influence of the magnetic field produced by the said coil when passed by the input current, and an output circuit connecting the anode surface with the cathode and coupled to an additional control circuit of the valve, the latter being independent of the input circuit and without influence on the same.

13. A thermionic valve system containing an evacuated valve having an anode surface and a cathode, an input circuit for said valve, means comprising an inductance coil inserted in said input circuit and arranged to magnetically control the emission of electrons from the cathode to the anode, a number of conducting surfaces situated between the cathode and the anode and arranged substantially parallel to the paths of the electrons so as to catch or reflect a quantity of the electrons deflected by the influence of the magnetic field produced by the said coil when passed by the input current, an output circuit connecting the anode surface with the cathode, a circuit connecting the said conductive surfaces with the cathode, and means for coupling the two last-named circuits together, the conductive surfaces thereby acting not only to catch or deflect the electrons by reason of the magnetic control, but also to effect an additional electrostatic control of the flow of the electrons.

14. An electric relay comprising an evacuated envelope having a cathode and an anode surface mounted therein in spaced relation, means for magnetically controlling the electron emission from the cathode to the anode, a number of conducting surfaces situated between the cathode and the anode and arranged substantially parallel to the paths of the electrons to intercept a varying part of the electron emission from the cathode to the anode, and an input circuit connected across the said means for magnetically controlling the electron emission.

15. An electric relay comprising an evacuated envelope having a cathode and an anode surface mounted therein in spaced relation, means for magnetically controlling the electron emission from the cathode to the anode, a number of conducting surfaces provided on said means and situated between the cathode and anode, said surfaces being arranged substantially parallel to the paths of the electrons, and an input circuit connected across the said means for magnetically controlling the electron emission.

CARL ARNE SCHLEIMANN JENSEN.